(12) United States Patent  
Raguse et al.

(10) Patent No.: US 12,541,791 B2  
(45) Date of Patent: Feb. 3, 2026

(54) QUALITATIVE COMMODITY MATCHING

(71) Applicant: Bushel, Inc., Fargo, ND (US)

(72) Inventors: Ryan Raguse, Fargo, ND (US); Jake Joraanstad, Fargo, ND (US); Dane Braun, Fargo, ND (US); Ted Steinmann, Fargo, ND (US)

(73) Assignee: Bushel, Inc., Fargo, ND (US)

( * ) Notice: Subject to any disclaimer, the term of this patent is extended or adjusted under 35 U.S.C. 154(b) by 631 days.

(21) Appl. No.: 17/569,271

(22) Filed: Jan. 5, 2022

(65) Prior Publication Data

US 2022/0207608 A1 Jun. 30, 2022

Related U.S. Application Data

(63) Continuation-in-part of application No. 16/542,937, filed on Aug. 16, 2019, now abandoned.

(60) Provisional application No. 63/134,173, filed on Jan. 5, 2021, provisional application No. 62/765,008, filed on Aug. 17, 2018.

(51) Int. Cl.  
*G06Q 40/04* (2012.01)

(52) U.S. Cl.  
CPC .................................. *G06Q 40/04* (2013.01)

(58) Field of Classification Search  
CPC . G06Q 40/04; G06Q 10/0631; G06Q 30/0611  
See application file for complete search history.

(56) References Cited

U.S. PATENT DOCUMENTS

| | | | | |
|---|---|---|---|---|
| 10,055,746 | B1* | 8/2018 | Ling | G06Q 30/0282 |
| 2008/0033864 | A1* | 2/2008 | McDonough | G06Q 40/03 |
| | | | | 705/37 |
| 2014/0310121 | A1* | 10/2014 | Bhojwani | G06Q 30/0611 |
| | | | | 705/26.4 |
| 2015/0371324 | A1* | 12/2015 | Kumar | G06F 15/00 |
| | | | | 705/26.3 |
| 2016/0110788 | A1* | 4/2016 | Stephenson | G06Q 10/087 |
| | | | | 705/7.29 |
| 2017/0364978 | A1* | 12/2017 | Loeb | G06Q 30/08 |
| 2018/0012163 | A1* | 1/2018 | Smith | G06F 16/243 |

OTHER PUBLICATIONS

Li, Yu-Hua, An Agent-Based Framework for Matching Buyers and Sellers, Oct. 1, 2008, 2008 4th International Conference on Wireless Communications, Networking and Mobile Computing, pp. 1-4 (Year: 2008).*

* cited by examiner

*Primary Examiner* — Kelly S. Campen  
*Assistant Examiner* — Timothy J Kang  
(74) *Attorney, Agent, or Firm* — Danielson Legal LLC

(57) ABSTRACT

Methods and systems for operating a commodity marketplace. The system may include an interface for at least receiving a seller marketing plan from each of a plurality of commodity sellers and a buyer marketing plan from a commodity buyer. The system may also include a processor executing instructions stored on memory and configured to select a plurality of seller marketing plans from the plurality of commodity sellers to satisfy the buyer marketing plan, and automatically generate a plurality of contracts based on the buyer marketing plan and the selected plurality of the seller marketing plans.

20 Claims, 9 Drawing Sheets

Seller Marketing Plan                                 — 302

Account Number: _____

Commodity to be sold: _____

Amount to be sold: _____ (lbs)

_____ (bushels)

Target Price(s): _____ ($/unit)

_____ (bushels)

Break even price: _____ ($)

SUBMIT  — 304

Able to deliver? ☐ Yes ☐ No

Delivery location: _____

Pick-up/delivery period:
(mm/dd/yyyy) to (mm/dd/yyyy)

Commodity Characteristics:

Protein content: _____

Moisture content: _____

FIG. 3

Buyer Marketing Plan — 402

Account Number: _____

Commodity to be purchased:
_____

Amount to be purchased:
_____ (lbs) _____ (bushels)

Offer price: _____ ($/unit)

Able to pick up? ☐ Yes ☐ No

Delivery location: _____

Pick-up/delivery period:
(mm/dd/yyyy) to (mm/dd/yyyy)

Commodity Characteristics desired:

Protein content: _____

Moisture content: _____

SUBMIT — 404

FIG. 4

QUALITATIVE COMMODITY MATCHING

CROSS-REFERENCE TO RELATED APPLICATIONS

The present application claims the benefit of and priority to U.S. provisional application No. 63/134,173, filed on Jan. 5, 2021, and is a continuation-in-part of U.S. utility patent application Ser. No. 16/542,937, filed on Aug. 16, 2019, which itself claims priority to U.S. provisional application No. 62/765,008, filed Aug. 17, 2018, the entire disclosure of each of which are hereby incorporated by reference as if set forth in their entirety herein.

TECHNICAL FIELD

Embodiments described herein generally relate to systems and methods for operating a commodity marketplace and, more particularly but not exclusively, to systems and methods for operating a commodity marketplace that enables increased specificity for buying and selling commodities.

BACKGROUND

Commodity markets such as those involving agricultural goods generally involve transactions of commodities that fall within constraints of specific, process-driven standards. For example, buyers of wheat products may only have the option of purchasing wheat by region (i.e., Chicago Wheat, Kansas City Wheat, Black Sea Wheat, Australian Wheat, etc.). Or, buyers may be limited by other qualitative factors such as weight, grade, or discount criteria.

These limitations are further exacerbated by the prevalence of specialty millers and increased demand for identity-preserved and sustainably grown crops. Current methods of conducting transactions with specialty products therefore result in a mismatch between buyers and sellers. Additional difficulties and lag are encountered in specifying criteria for more complex quality metrics such as amino acid content.

Existing techniques also require specificity in contracts involving specialty crops. These techniques are therefore slow to respond to shifts in consumer demand, regulatory concerns, supply chain logistics, environmental concerns, or the like.

A need exists, therefore, for improved methods and systems for operating commodity markets.

SUMMARY

This summary is provided to introduce certain concepts in a simplified form that are further described below in the Detailed Description. This summary is not intended to identify key features or essential features of the claimed subject matter, nor is it intended to limit in any way the scope of the claimed invention.

In one aspect, embodiments relate to a method of operating a commodity marketplace. The method includes presenting, using a first interface, a seller marketing plan template to each of a plurality of commodity sellers, each commodity seller operating a seller device executing program instructions to present the first interface, the first interface configured to allow a commodity seller using the seller device to input using natural language at least one feature regarding at least one commodity for sale; receiving, through a network, a seller marketing plan from each of the plurality of commodity sellers, the seller marketing plan created using the first interface from the seller marketing plan template and comprising the at least one feature regarding the at least one commodity for sale; presenting, using a second interface, a buyer marketing plan template to a commodity buyer operating a buyer device executing program instructions to present the second interface, the second interface configured to allow the commodity buyer using the buyer device to specify at least one feature using natural language regarding at least one desired commodity for purchase; receiving, through the network, a buyer marketing plan from the commodity buyer, the buyer marketing plan created using the second interface from the buyer marketing plan template and comprising the at least one feature specified using natural language regarding the at least one desired commodity for purchase; selecting, using a processor executing program instructions, a plurality of seller marketing plans from the plurality of commodity sellers to at least partially match the at least one feature for the at least one desired commodity for purchase in the buyer marketing plan; automatically generating, with the processor executing program instructions, a plurality of electronic contracts based on the buyer marketing plan and the matching plurality of the seller marketing plans for execution by the commodity buyer using the buyer device and each seller associated with each of the plurality of the seller marketing plans using the seller device; and storing the executed contracts in a database.

In some embodiments, the at least one feature regarding the at least one commodity for sale is at least one of a break-even price, a collection of target prices, units to be sold at a target price, an expiration date, characteristics of a commodity, a delivery period, or a delivery location.

In some embodiments, the at least one feature regarding the at least one commodity for purchase is a number of units to be purchased, a delivery period, or a delivery location.

In some embodiments, the first interface is a user interface.

In some embodiments, the contract is generated without presenting the plurality of seller marketing plans from the plurality of commodity sellers to the commodity buyer.

In some embodiments, identities of each of the plurality of commodity sellers are suppressed from each other and from the commodity buyer.

In some embodiments, the contract is generated without presenting the buyer marketing plans from the plurality of buyers to the commodity seller.

In some embodiments, the method further includes receiving an executed contract from the commodity buyer and the commodity seller associated with the selected at least one seller marketing plan.

In some embodiments, a first commodity seller satisfies a first portion of the buyer marketing plan, and a second commodity seller satisfies a second portion of the buyer marketing plan.

According to another aspect, embodiments relate to a system for operating a commodity marketplace. The system includes an interface for at least receiving a seller marketing plan from each of a plurality of commodity sellers, each seller marketing plan comprising information entered using the interface comprising at least one of a type of commodity to be sold, an amount of the commodity to be sold, a target price, a break even price, delivery information, a pickup period, a delivery period, or a commodity characteristic, and a buyer marketing plan from a commodity buyer, the buyer marketing plan comprising information entered using the interface comprising at least one of a type of commodity to be purchased, an amount of the commodity to be purchased, an offer price, delivery information, a pickup period, a delivery period, or a commodity characteristic; and a processor executing instructions stored on memory and configured to: select a plurality of seller marketing plans from the plurality of commodity sellers to satisfy the buyer marketing plan based on the information from the buyer marketing plan entered using the interface and the information from the plurality of seller marketing plans using the interface without presenting the seller marketing plans from the plurality of commodity sellers to the commodity buyer; and automatically generate a plurality of contracts based on the buyer marketing plan and the selected plurality of the seller marketing plans for execution by the commodity buyer and each seller associated with each of the plurality of the seller marketing plans.

In some embodiments, a seller's marketing plan is defined by at least one of a break-even price, a collection of target prices, units to be sold at a target price, an expiration date, characteristics of a commodity, a delivery period, and a delivery location.

In some embodiments, the buyer marketing plan is defined by at least one of a commodity to be purchased, number of units to be purchased, a delivery period, and a delivery location.

In some embodiments, the commodity is grain.

In some embodiments, the contract is generated without presenting the plurality of seller marketing plans from the plurality of commodity sellers to the commodity buyer.

In some embodiments, the identities of each of the plurality of commodity sellers are suppressed from each other and from the commodity buyer.

In some embodiments, the contract is generated without presenting the buyer marketing plans from the plurality of buyers to the commodity seller.

In some embodiments, the interface is further configured to receive an executed contract from the commodity buyer and the commodity seller associated with the selected at least one seller marketing plan.

In some embodiments, a first commodity seller satisfies a first portion of the buyer marketing plan, and a second commodity seller satisfies a second portion of the buyer marketing plan.

BRIEF DESCRIPTION OF THE DRAWINGS

Non-limiting an non-exhaustive embodiments of the embodiments herein are described with reference to the following figures, wherein like reference numerals refer to like parts throughout the various views unless otherwise specified.

FIG. 3 illustrates an exemplary seller marketing plan template in accordance with one embodiment;

FIG. 4 illustrates an exemplary buyer marketing plan template in accordance with one embodiment;

DETAILED DESCRIPTION

Figure 1:
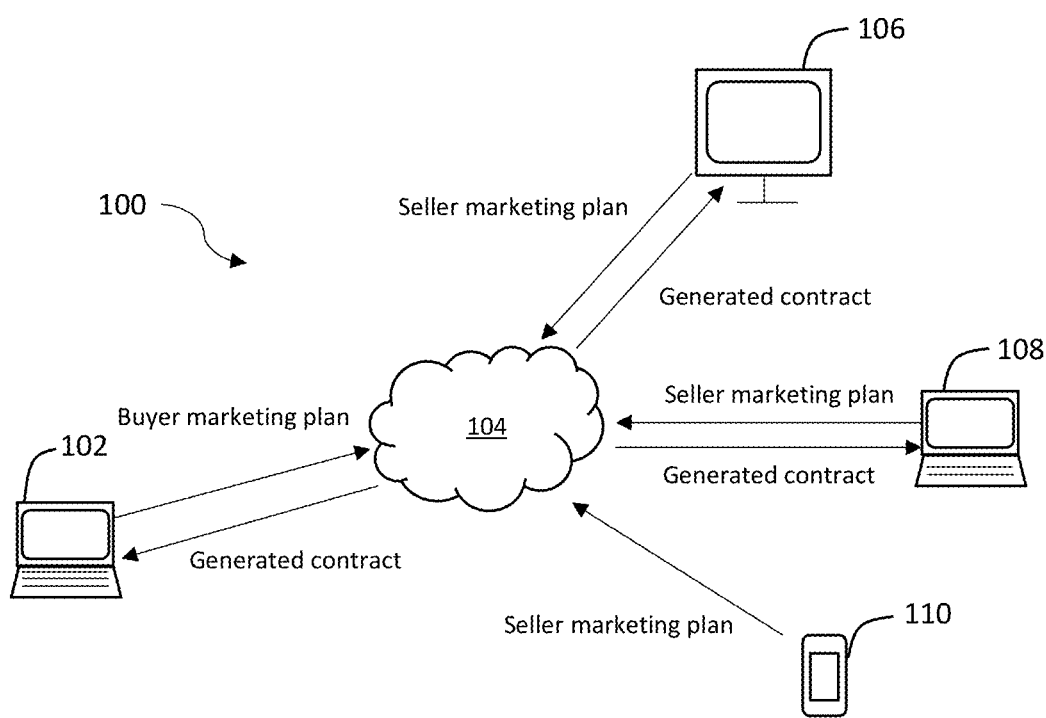
FIG. 1 illustrates a commodity marketplace architecture in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, existing techniques for matching commodity sellers and buyers suffer from various inefficiencies. For example, these techniques generally are one-sided and often favor buyers with whom sellers have a preexisting relationship.

Embodiments described herein provide novel commodity exchange methods and systems that anonymously connect a tentative buyer with one or more of a plurality of commodity sellers. The systems and methods described herein provide a blind marketplace that matches a willing buyer to one or more willing sellers in order to initiate a commodity transaction based on submitted marketing plans such as those including natural language input. The identities of the buyer and the sellers are kept secret, as are their submitted marketing plans.

FIG. 1 illustrates a commodity marketplace architecture 100 in accordance with one embodiment. As seen in FIG. 1, a buyer may operate a buyer device 102 (illustrated as a laptop) to submit a buyer marking plan to a commodity marketplace 104. Similarly, one or more sellers may operate seller devices (illustrated as a PC 106, a laptop 108, and a mobile phone 110) to submit seller marketing plans to the commodity marketplace 104.

The buyer's submitted marketing plan may define characteristics associated with the buyer's preferences or desired product(s). For example, the buyer may use natural language input to define the type of commodity they wish to purchase, their offer price, the amount of the commodity they wish to purchase, or the like.

Similarly, the sellers's submitted marking plans my define characteristics associated with each of the seller's products they wish to sell. For example, each seller may use natural language input to define the type of commodity they wish to sell, their asking price(s), the amount of the commodity they wish to sell, or the like.

The commodity marketplace may then match the buyer with one or more sellers whose marketing plan(s) at least partially match the buyer's marketing plan. The commodity marketplace 104 may then autonomously generate a contract for execution by the buyer and one or more of the sellers associated with the selected seller marketing plan(s).

The commodity marketplace is 104 "blind" in that the parties do not know with whom they are interacting. However, sellers may specify buyers to whom they are willing to sell. That way, sellers may specify buyers within a threshold distance from them to avoid entering into contracts with buyers that are prohibitively far from the seller. Similarly, the submitted marketing plans are not shown to the other parties.

Figure 2:
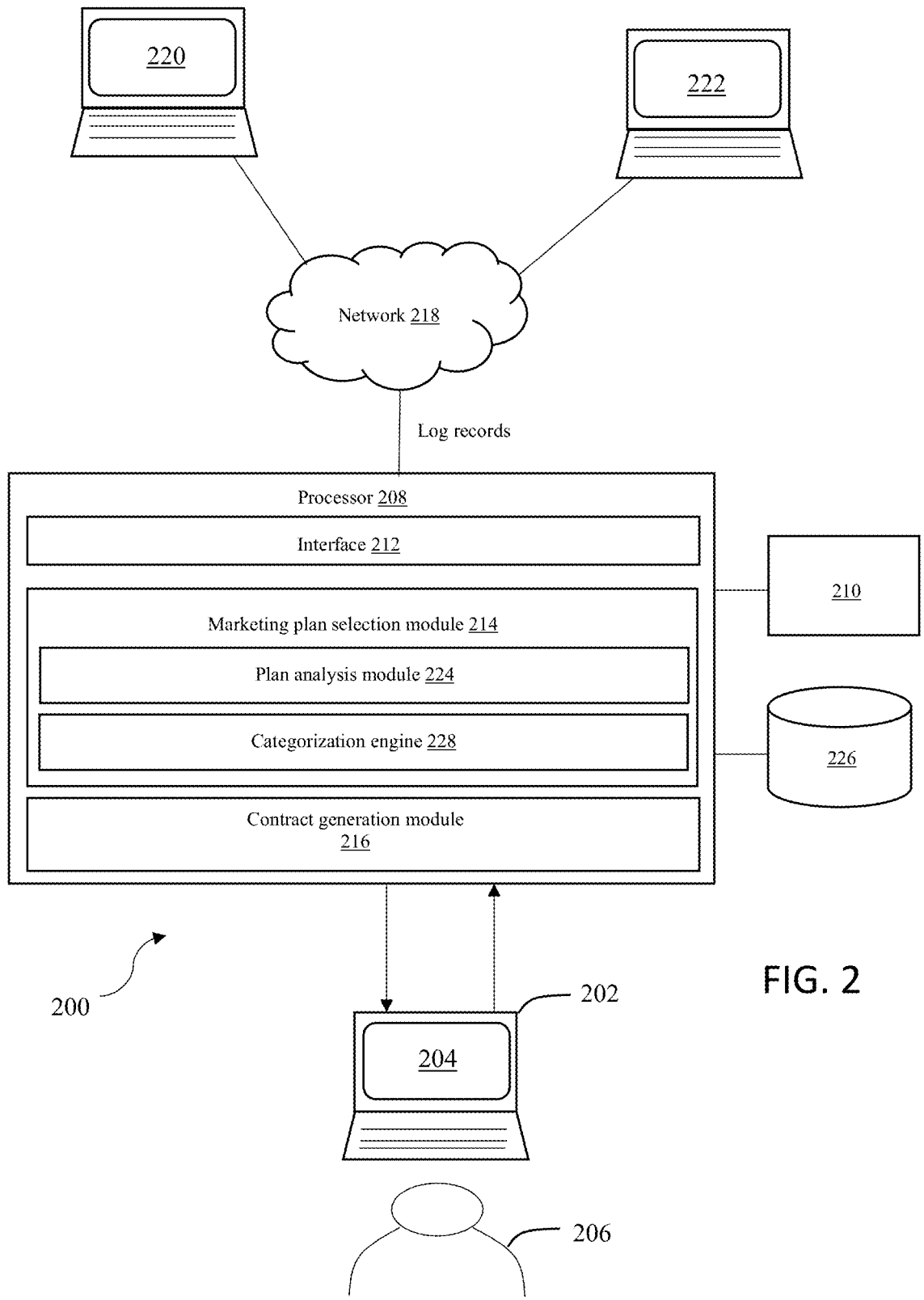
FIG. 2 illustrates a system for operating a commodity marketplace in accordance with one embodiment.

FIG. 2 illustrates a system 200 for operating a commodity marketplace in accordance with one embodiment. The system 200 includes a user device 202 executing a user interface 204 for presentation to one or more users 206 such as a commodity buyer or a commodity seller.

The user device 202 may be any hardware device capable of executing the user interface 204. The user device 202 may be configured as a laptop, PC, tablet, mobile device, or the like. The exact configuration of the user device 202 may vary as long as it can execute and present the user interface 204 to the user 206. The user interface 204 may allow the user 206 to input parameters to generate their marketing plan.

For example, FIG. 3 illustrates an exemplary seller marketing plan template 302. The seller marketing plan template 302 may be presented to a seller via a user interface such as the user interface 204 of FIG. 2 to allow the seller to input various parameters regarding their commodity(ies) they wish to sell.

A seller may enter information such as any one or more of an account number that is associated with the seller and known by the system 200, the type of commodity to be sold, the amount of the commodity to be sold (e.g., in terms of some quantifiable units such as pounds or number of bushels), target prices, a break even price, whether the seller is able to deliver the commodity (and where), and commodity characteristics such as protein content, amino acid content, and moisture content. The seller marketing plan template 302 may present other information in addition to or in lieu of the information shown in FIG. 3.

The information of the template may be presented in a variety of ways. For example, the template 302 may allow the user to type in entries using natural language, to select items from a drop-down menu, to check boxes, to select radio buttons, or the like. The type of information presented to the user and the way(s) in which it is presented may vary as long as sellers can enter parameters to generate their marketing plan. Once the seller is content with their generated marketing plan, they may select a "submit" option 304 to communicate their plan to a commodity marketplace such as the commodity marketplace 104 of FIG. 1.

FIG. 4 illustrates a buyer marketing plan template 402 in accordance with one embodiment. The buyer marketing plan template 402 may be presented to a buyer to allow a buyer to input various parameters regarding the commodity(ies) they wish to purchase.

A buyer may enter information such as any one or more of an account number that is associated with the buyer and known by the system 200, the type of commodity they wish to purchase, the amount to be purchased (e.g., in terms of some quantifiable units such as pounds or number of bushes), offer price, whether they're able to pick up the commodity order (and where and when), and desired commodity characteristics such as protein content, amino acid content, and moisture content. The buyer marketing plan template 402 may present other information in addition to or in lieu of the information shown in FIG. 4.

Similarly, the information making up the buyer marketing plan template 402 may be presented in a variety of ways. For example, the template 402 may allow the user to type in entries using natural language, to select items from a drop-down menu, to check boxes, to select radio buttons, or the like. The type of information presented to the user and the way(s) in which it is presented may vary as long as a buyer can enter parameters to define their marketing plan. Once the buyer is content with their generated marketing plan, they may select a "submit" option 404 to communicate their plan to the commodity marketplace such as the commodity marketplace 104 of FIG. 1.

Referring back to FIG. 2, the user device 202 may be in operable communication with one or more processors 208. The processors 208 may be any hardware device capable of executing instructions stored on memory 210 to accomplish the objectives of the various embodiments described herein. The processor(s) 208 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 208 may be configured as part of the user device 202 on which the user interface 204 executes, such as a laptop, or may be located on a different computing device, perhaps at some remote location.

The processor 208 may execute instructions stored on memory 210 to provide various modules to accomplish the objectives of the various embodiments described herein. Specifically, the processor 208 may execute or otherwise include an interface 212, a marketing plan selection module 214, and a contract generation module 216.

The memory 210 may be L1, L2, L3 cache or RAM memory configurations. The memory 210 may include non-volatile memory such as flash memory, EPROM, EEPROM, ROM, and PROM, or volatile memory such as static or dynamic RAM, as discussed above. The exact configuration/type of memory 210 may of course vary as long as instructions for operating a commodity marketplace can executed by the processor 208 to accomplish the objectives of various embodiments described herein.

The interface 112 may have access to one or more networks 218 and may be in communication with one or more market participants 220 and 222. The market participants 220 222 may include a buyer or other sellers who may similarly submit marketing plans as discussed previously.

The network(s) 218 may link the various devices with various types of network connections. The network(s) 218 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 218 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the interface 212 may receive a buyer marketing plan from a buyer and one or more seller marketing plans from sellers. The marketing plan selection module 214 may then execute a plan analysis module 224 to analyze the submitted plans to find agreeable terms between a buyer and one or more sellers.

Figure 5:
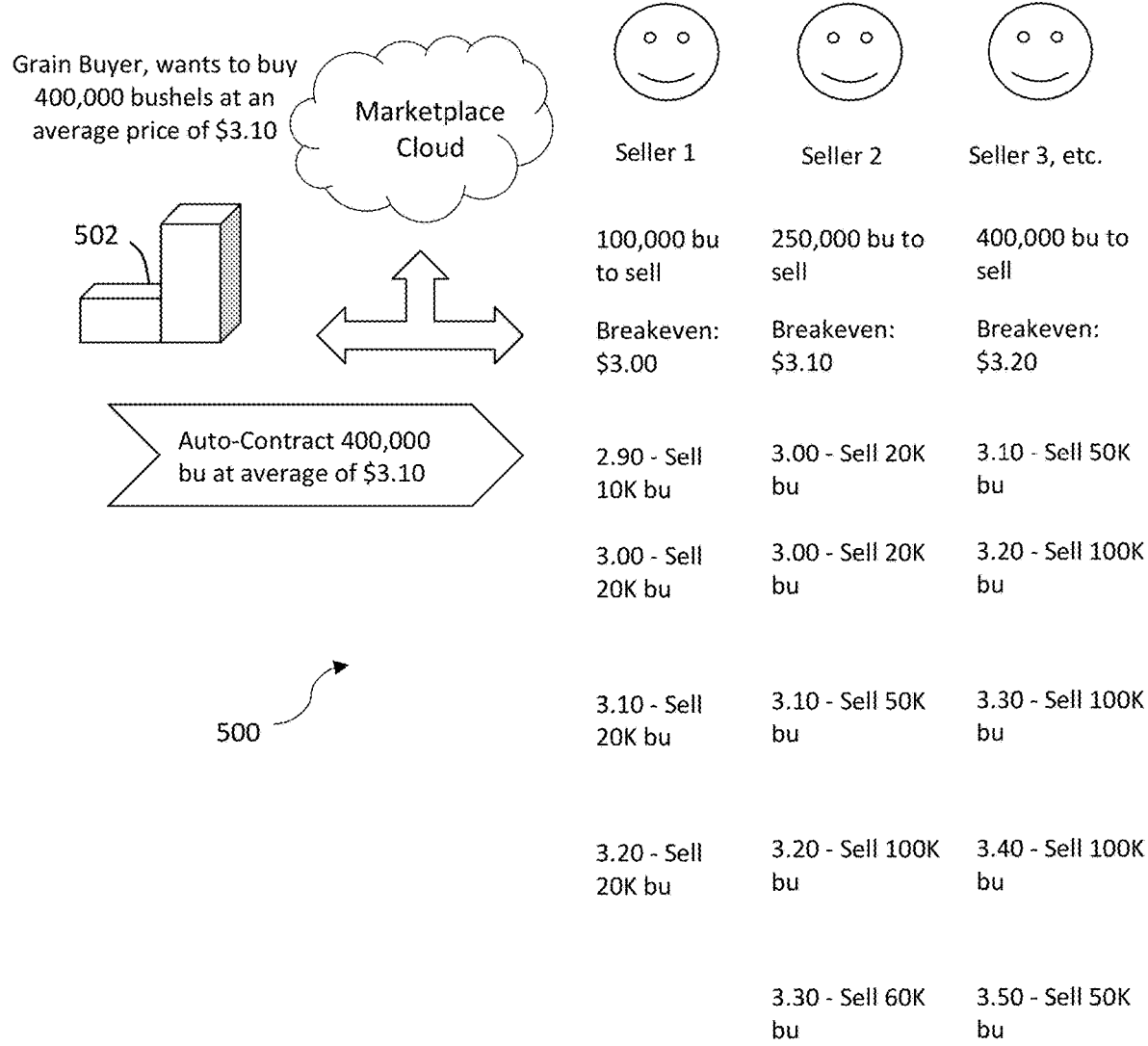
FIG. 5 presents a graphical illustration of a blind commodity marketplace in accordance with one embodiment.

For example, FIG. 5 presents a graphical illustration 500 of a blind commodity marketplace in accordance with one embodiment. The graphical illustration 500 of the blind marketplace presents a grain buyer 502 interested in buying 400,000 bushels or other type of unit of a commodity (e.g., grain) at an average price of $3.10. This data may be gleaned from a submitted buyer marketing plan such as one generated from the template 402 of FIG. 4. The data associated with the buyer's marketing plan is not shown to the sellers. Although the present application largely discussed grain as the commodity of interest, any other sort of commodity may be considered.

Commodity sellers (such as growers) may similarly input various parameters such as those discussed above to define their marketing plan. For example, FIG. 5 shows that "Seller 1" has 100,000 bushes for sale and a breakeven price of $3.00. Seller 1 has further specified he or she has 10,000 bushels to sell at $2.90 per bushel, 20,000 bushels to sell at $3.00 per bushel, etc. These may represent different price points that make up a seller's overall marketing plan. That is, Seller 1 may initially hope to sell the 10,000 bushels at $2.90 per bushel. However, if a buyer does not make a bid at that price point, the next lowest the seller is willing to offer is the 20,000 bushels at $3.00 per bushel.

Similarly, FIG. 5 shows that "Seller 2" has 250,000 bushels to sell at a breakeven price of $3.10 per bushel. Seller 2 has further specified he or she has 20,000 bushels to sell at $3.00 per bushel, 50,000 bushels to sell at $3.10 per bushel, etc.

FIG. 5 only shows data regarding pricing and quantity. However, other data such as data specified by the seller and buyer marketing templates discussed previously may be considered. The data associated with the sellers is not shown to other sellers or the buyer. Additionally, market participants may use natural language input to provide other parameters in addition to or in lieu of those included in the templates.

The plan analysis module 224 may analyze this type of data to select one or more seller marketing plans to satisfy the buyer marketing plan. For example, the plan analysis module 224 may be configured to select seller marketing plans that can entirely satisfy the buyer's marketing plan. Or, if a single seller marketing plan cannot entirely fulfil a buyer's marketing plan, the plan analysis module 224 may select the seller marketing plan that is able to most completely fulfil the buyer's marketing plan.

For example, a buyer may wish to purchase 100,000 bushels and a first seller is offering to sell 90,000 bushels and a second seller is offering to sell 40,000 (all at an agreeable price), the marketing plan selection module 214 may give preference to the first seller to fill the majority of the buyer's marketing plan, and then give preference to another seller who can supply the remaining 10,000 bushels.

The marketing plan selection module 214 may also be configured to consider various factors in selecting which seller marketing plan(s) are to satisfy the buyer marketing plan. As another example, if two different sellers are offering to sell the exact same amount of a commodity the buyer is requesting (and at the same price), the marketing plan selection module 214 may select the seller marketing plan associated with the seller that is geographically located closest to the buyer.

In some embodiments, one or more databases 226 may store reviews of contracting parties. That is, contracting parties may rate their experience with their transactions and the supplying or buying party. Although the identities of the contracting parties are kept secret, a buyer may rate the transaction based on whether the commodity was delivered as described and on time. These ratings may be attributed to the seller and may be considered in whether their plans are selected in the future.

Once the marketing plan selection module 214 selects one or more seller marketing plans to satisfy the buyer marketing plan, the contract generation module 216 may generate a contract for execution by the buyer and one or more sellers associated with the selected marketing plan(s). The generated contracts may outline the terms of an agreement between the contracting parties, and may be presented to the contracting parties via any suitable type of user interface.

The marketing plan selection module 214 may also include or otherwise execute a categorization engine 228 for analyzing, categorizing, indexing, and matching criteria and selling criteria based on natural language input. The analysis stage may involve using natural language processing techniques to gather product specifications from buyer and seller interfaces.

For example, in some embodiments, buyers may search for agricultural products, and be presented with a ranked list of scored sources. Upon receiving or after a buyer receives a proposed list of matches, the buyer may indicate a level of a match between their desired criteria and the product(s) proposed or received. This feedback may be fed into a model to increase the model's accuracy for subsequent searches.

In accordance with the embodiments herein, buyers can find and sellers can place agricultural products on an open exchange or through a direct, one-to-one exchange using more advanced criteria that, in some embodiments, may be specified using natural language. For example, buyers can specify desired protein levels of a product, alkalinity of the soil, acidity of the soil, a requirement for no-till agriculture, a potential carbon score range for the product, maximum toxin level, timeline of desired acquisition, types of fertilizers or pollination methods, types of animal feed, distance between buyer and seller, transportation requirements, or any other type of request that may be detected via, e.g., natural language processing. In some embodiments, the system 200 may autonomously generate request criteria or prompts for the buyer.

Similarly, sellers can specify amino acid levels such that, when mixed with an existing product, the produced batch or lot will meet downstream product requirements. Sellers may also specify any other type of request that may be detected via, e.g., natural language processing, such as those listed above.

The disclosed embodiments may therefore enable increased specificity for specialty products by using natural language processing (NLP). This may help achieve higher-product margin sales from downstream drivers such as marketing food attributes, animal feed profiles, or minimum milling requirements.

Figure 6:
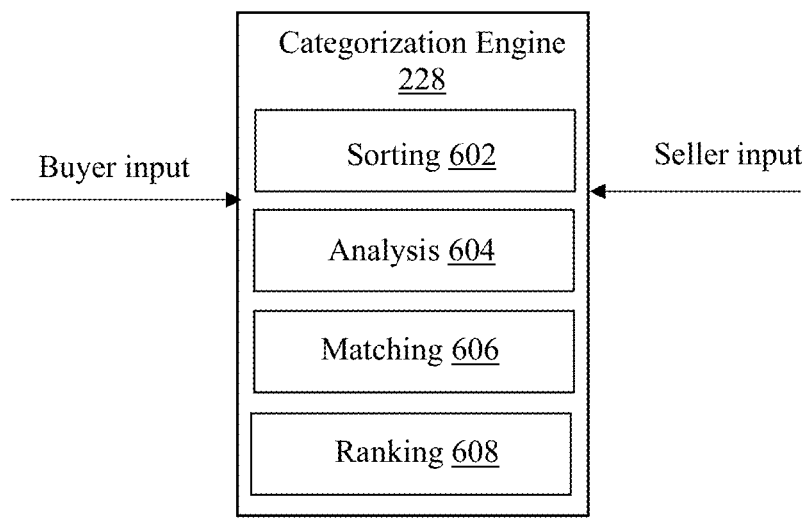
FIG. 6 illustrates the categorization engine of FIG. 2 in accordance with one embodiment.

In some embodiments, the categorization engine 228 may calculate a match between parties' purchase and sales requests using NLP, and may then generate and provide a ranked list of the matches to one or more parties. FIG. 6 illustrates the categorization engine 228 of FIG. 2 in accordance with one embodiment. The categorization may include or otherwise execute a sorting module 602, an analysis module 604, a matching module 606, and a ranking module 608.

In operation, the categorization engine 228 may receive input from one or more potential commodity buyers. For example, a potential buyer (for simplicity "buyer") may provide natural language input regarding the description of a desired product. For example, a buyer may specify "wheat" and natural language descriptions of any one or more of desired protein levels of a product, alkalinity of the soil, acidity of the soil, a requirement for no-till agriculture, a potential carbon score range for the product, maximum toxin level, timeline of desired acquisition, types of fertilizers or pollination methods, types of animal feed, distance between buyer and seller, transportation requirements, or any other type of criteria that may be provided via natural language input.

The buyer input may be communicated to the sorting module 602. The sorting module 602 may be configured to perform any appropriate sorting or serialization procedures associated with the buyer input. For example, buyer input may be represented as a data object, and the sorting module 602 may convert this data object to any suitable series of bytes that saves the data object in an easily transmittable and storable form. The converted series may be stored in any suitable location such as in memory, a database, or other type of file for later use.

The sorting module 602 may similarly sort the received buyer input based on the type of product and any other type of provided descriptions. For example, if the desired product is wheat with a particular protein level, the buyer input may be stored in a location associated with the particular type of wheat with a similar protein level. The sorting module 602 may also perform any other appropriate transformation procedures to transform the input into a standard searchable format.

The analysis module 604 may then analyze the stored data. The analysis module 604 may execute any suitable natural language procedures to analyze the stored data. For example, the analysis module 604 may categorize and index certain inputs by keywords. The analysis module 604 may identify, tag, and search words or other characters present in buyer or seller inputs. This may help remove any noise or other characters that are unnecessary to accomplish the objectives of the embodiments herein.

The analysis module 604 may also perform any linguistic processing steps to recognize meaningful characters included in an input. These steps may help the categorization engine 228 identify sentences and the relationships between words, numbers, or the like. These steps may also identify categories of inputs that may be unattainable by pure text mining approaches. These may include dates, locations such as those defined by GPS coordinates or addresses, quantity values, product descriptions, levels of importance of product descriptions, or the like.

The output of the analysis module 604 may be presented to the buyer for review or confirmation. For example, the buyer may have the opportunity to review any keywords or prompts generated by the analysis module 604, as well as the opportunity to add or modify any keywords, qualities, descriptions, or the like.

The categorization engine 228 may also receive input from one or more potential sellers (for simplicity, "seller(s)"). A seller may similarly provide natural language input regarding their product(s) and descriptions thereof. The product descriptions or attributes may include those associated with buyer input discussed previously.

Figure 7:
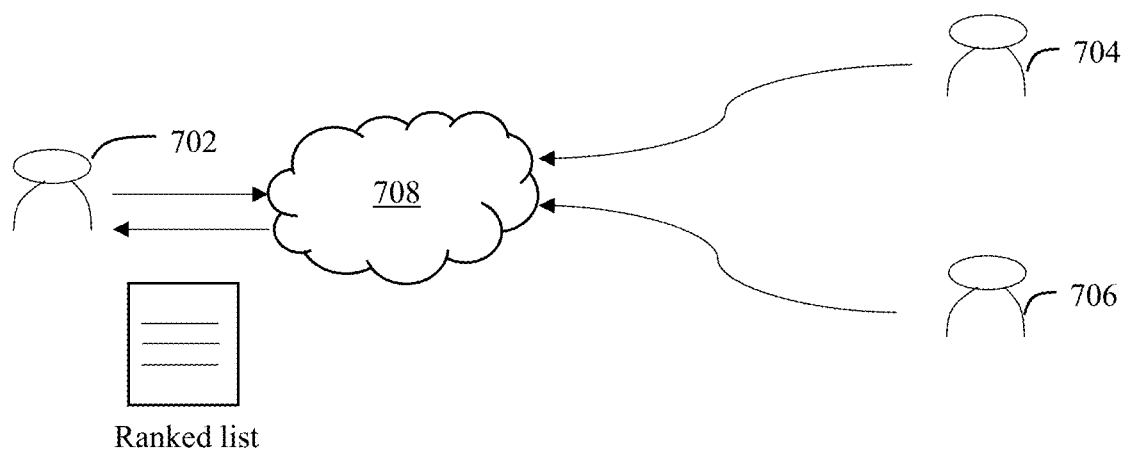
FIG. 7 illustrates a buyer and sellers providing inputs to the system of FIG. 2 in accordance with one embodiment.

For example, FIG. 7 illustrates a buyer 702 and sellers 704 and 706 providing inputs. For example, seller 704 may indicate they have Kansas City red winter wheat for sale, and seller 706 may indicate they have Grade 1 Canadian extra strong red spring wheat for sale. The sellers 704 and 706 may indicate their products for sale by using natural language inputs, which are then communicated to the network 708 and, more particularly, a categorization engine such as the categorization engine 228.

The matching module 606 may then match descriptions from the buyer(s) and seller(s). Specifically, the matching module 606 may match seller and buyer input as represented by the outputs of the analysis module 604 obtained by natural language processing.

Figure 8:
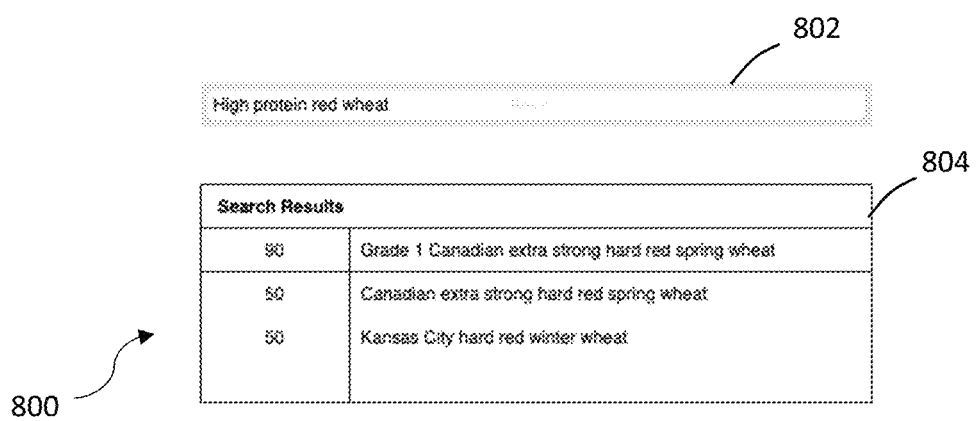
FIG. 8 illustrates an interface presented to a buyer in accordance with one embodiment.

For example, FIG. 8 illustrates an interface 800 through which a buyer is entering a desired product (i.e., "high protein hard red wheat") into a search bar 802. This input may be communicated to a network 708 such as the network 218 of FIG. 2.

In some embodiments, the matching module 606 may calculate probabilities for different products that potentially match the buyer's desired products. The matching module 606 may then determine one or more potential matches based on seller input(s). The interface 700 may output a results table 804 that lists potential matches to the buyer's input entered in search bar 802, along with a probability value indicating the probability that the corresponding seller input matches the buyer input.

The ranking module 608 of the categorization engine 228 may rank entries associated with sellers based on various attributes and how well they would satisfy a particular buyer's request. The results provided by the ranking module 608 may be presented to the buyer for review as in FIGS. 7 & 8. The buyer may then review the presented options, and confirm whether they wish to purchase a presented product.

In addition to confirming or rejecting a proposed option, a buyer may provide feedback regarding the accuracy of the returned seller options. For example, the buyer may indicate the accuracy of a proposed product for sale based on its quantity, description, location, or other type(s) of attributes. This type of feedback may improve the performance of the categorization engine 228 by any appropriate supervised-based machine learning techniques.

The use of natural language processing to match market participants based on qualitative data provides several advantages over existing techniques. As discussed above, the natural language processing steps performed by the categorization engine 228 achieve a greater understanding of buyer preferences and seller products than possible with pure text recognition approaches. This enables a more accurate and up-to-date understanding of market conditions.

The embodiments herein also achieve several improvements in computer functionality. The use of the marketing templates reduces the number of data preparation steps as it ensures data is provided in at least a somewhat uniform fashion. For example, the templates provide designated locations or fields for certain attributes. This minimizes the amount of pre-processing or analysis required on the received inputs.

Similarly, data associated with entire buyer marketing plans and seller marketing plans are not shown to each other. This conserves computing resources, as resources for interpreting, processing, and presenting data are not required. This enables fully anonymous or pseudononymous matching or buyers and sellers that would not be possible in an in-person marketplace lacking this technology.

In some embodiments, the categorization engine 228 may not use the marketing templates. As the categorization engine 228 can receive and process natural language input, the embodiments herein do not requires templates comprising multiple designated fields to receive and process input. Accordingly, this preserves computing resources as space isn't required to store various types of templates.

The categorization engine 228 also allows for greater flexibility for users in providing queries. Rather than requiring a user to, for example, populate a certain number of or all fields of a template, a user can use natural language to provide a desired amount of detail.

The previously-discussed templates also present the fields in terms of certain units. For example, the buyer marketing plan of FIG. 5 requires users to input the offer price in terms of "$/unit" and requires the pick-up date to be entered in a particular format (i.e., mm/dd/yyyy). Accordingly, a user's input may be rejected or interpreted incorrectly if not provided in the proper format or location. Additionally, the type of data a user may provide via a template is limited to the fields thereof.

The embodiments described herein provide systems and methods that can collect natural language input from a plurality of market participants and convert it into an appropriate (e.g., standardized) format for storage or further analysis. These parties are given remote access through an interface to provide inputs regarding desired products and products for sale, thereby providing a real time view of market conditions.

The categorization engine 228 may then automatically generate in real time one or more proposals based on stored, converted inputs. Accordingly, an interested party such as a potential buyer can receive in real time market prices and commodities for sale. This provides a novel improvement over existing techniques, which are slow to respond to shifts in consumer demand and regulatory concerns.

The network(s) of the embodiments herein may also be in operable communication with facility components associated with a buyer or seller. If a seller's offer is accepted or likely to be accepted (e.g., the seller's product has the highest probability associated with a buyer's request), machinery at the seller's facility may automatically begin to prepare the product for processing to complete the transaction. For example, an elevator or dispenser associated with a seller may automatically dispense a desired amount of a particular product onto a conveyor belt to initiate a product shipment. Accordingly, facilities associated with one or more parties may employ the information provided by parties to operate machinery to execute a transaction. This at the very least expedites the transaction and avoids the need for a seller or buyer to manually operate the appropriate machinery.

Figure 9:
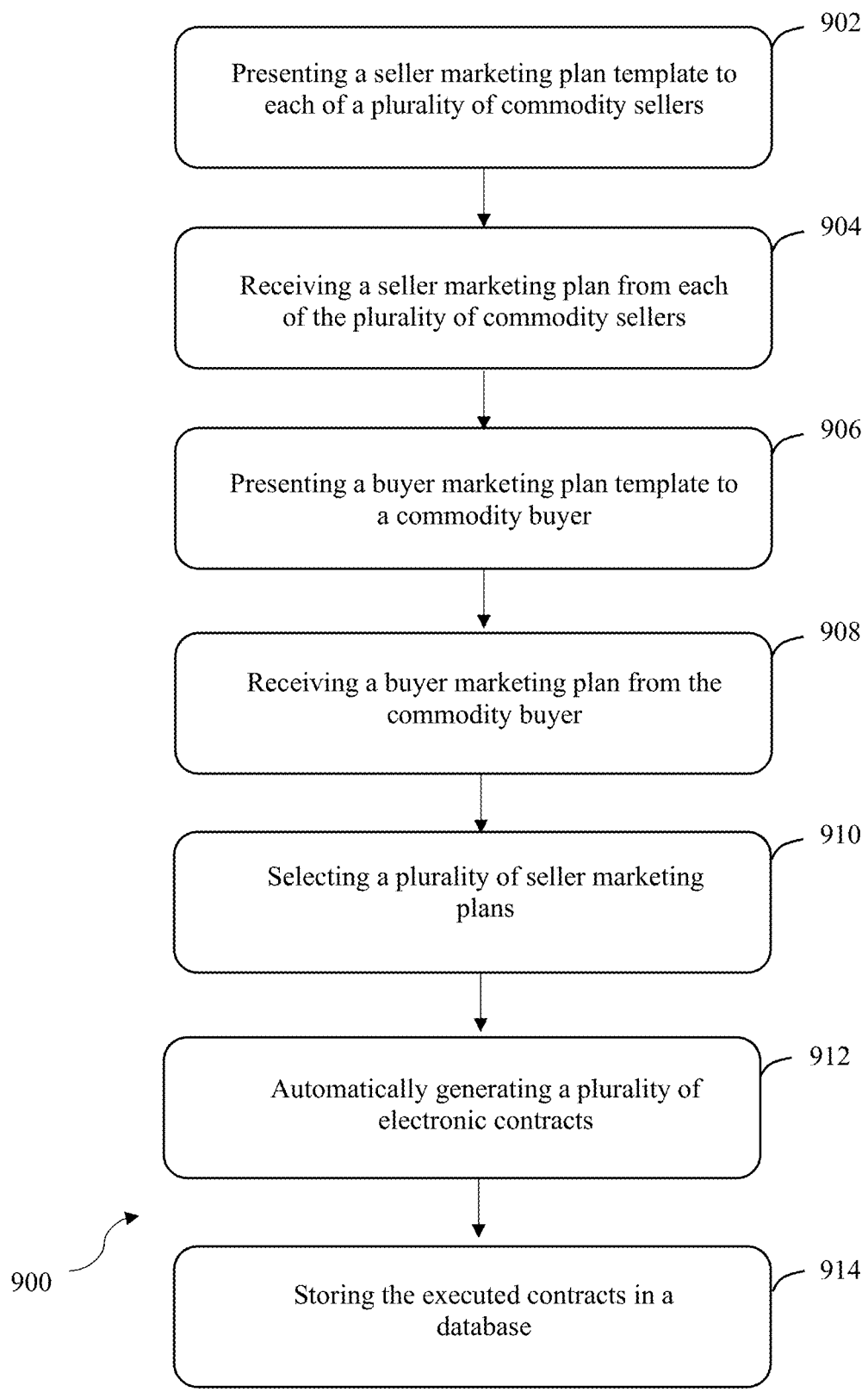
FIG. 9 depicts a flowchart of a method of operating a commodity marketplace in accordance with one embodiment.

FIG. 9 depicts a flowchart of a method 900 of operating a commodity marketplace in accordance with one embodiment. The system 200 of FIG. 2 or components thereof may perform the steps of method 900.

Step 902 involves presenting, using a first interface, a seller marketing plan template to each of a plurality of commodity sellers, each commodity seller operating a seller device executing program instructions to present the first user interface. The first interface may be configured to allow a commodity seller using the seller device to input using natural language at least one feature regarding at least one commodity for sale. For example, a seller may use natural language in a search bar or field associated with a seller marketing template such as the one of FIG. 4.

The data or information provided by the seller may vary and may depend on the type of product for sale. For example, the seller may input features such as, but not limited to, a break-even price, a collection of target prices, units to be sold at a target price, an expiration date, characteristics of a commodity, a delivery period, a delivery location, or the like.

Step 904 involves receiving, through a network, a seller marketing plan from each of the plurality of commodity sellers. The seller marketing plan(s) may be created using the first interface from the seller marketing plan template and comprising the at least one feature regarding the at least one commodity for sale. The attributes or features may include those listed above.

Step 906 involves presenting, using a second interface, a buyer marketing plan template to a commodity buyer operating a buyer device executing program instructions to present the second interface. The second interface may be configured to allow the commodity buyer using the buyer device to specify at least one feature using natural language regarding at least one desired commodity for purchase. In these embodiments, the "buyer" may refer to a person or entity that would like to purchase a commodity. The buyer may input a desired product or features thereof via natural language, such as in a field of a buyer marketing template.

Step 908 involves receiving, through the network, a buyer marketing plan from the commodity buyer, the buyer marketing plan created using the second user interface from the buyer marketing plan template and comprising the at least one feature specified using natural language regarding the at least one desired commodity for purchase. For example, the buyer may use natural language to specify features such, but not limited to, a number of units to be purchased, a delivery period, a delivery location, or the like.

Step 910 involves selecting, using a processor executing program instructions, a plurality of seller marketing plans from the plurality of commodity sellers to at least partially match the at least one feature for the at least one desired commodity for purchase in the buyer marketing plan. A categorization engine such as the categorization engine 228 of FIGS. 2 and 6 may perform natural language processing on the received inputs to match, as closely as possible, a buyer's request with one or more seller products. In some embodiments, the categorization engine (in conjunction with other components of system 200) may select one or more sellers or otherwise one or more seller entries to satisfy a buyer's request. For example, if a first seller has enough of a particular commodity to satisfy 70% of the buyer's order, the categorization engine may also select a second seller to satisfy the remaining 30% of the buyer's order.

In the context of the present application, "at least partially match" also recognizes that a particular product for sale may not entirely match a buyer's product request. For example, a product for sale may have a protein content that is outside of a buyer-requested range. The embodiments herein may be configured to accept a particular product even if certain attributes differ from a buyer's request, albeit within some threshold range.

Step 912 involves automatically generating, with the processor executing program instructions, a plurality of electronic contracts based on the buyer marketing plan and the matching plurality of the seller marketing plans for execution by the commodity buyer using the buyer device and each seller associated with each of the plurality of the seller marketing plans using the seller device. Step 912 may occur upon a buyer confirming a particular seller's product for sale is acceptable. The generated contract(s) may then be sent to the appropriate market participants for their execution.

In some embodiments, the contract(s) is generated without presenting the seller marketing plan(s) from the plurality of commodity sellers to the buyer(s). Similarly, the contract may be generated without presenting the buyer marketing plan(s) to the commodity seller(s). Additionally, the identities of the sellers may be suppressed from each other and from the buyer. Similarly, the identity of the buyer may be suppressed from the seller(s).

Step 914 involves storing the executed contracts in a database. These contracts may be stored and later retrieved.

Figure 10:
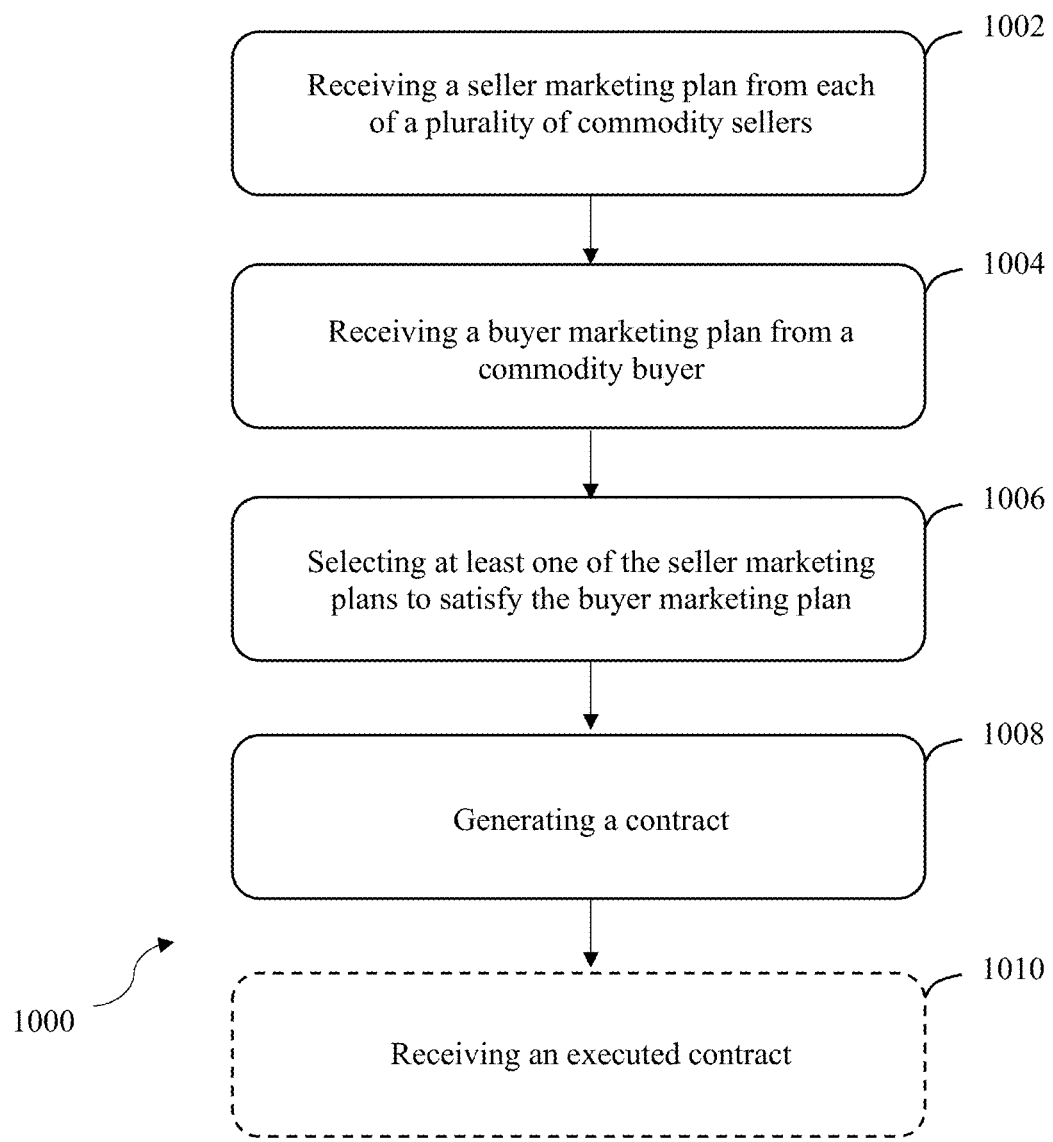
FIG. 10 depicts a flowchart of a method of operating a commodity marketplace in accordance with another embodiment.

FIG. 10 depicts a flowchart of a method 1000 of operating a commodity marketplace in accordance with one embodiment. The system 200 of FIG. 2 or the components thereof may perform the steps of the method 1000.

Step 1002 involves receiving at an interface a seller marketing plan from each of a plurality of commodity sellers. The interface may be accessible by or otherwise receive seller marketing plans from sellers that have, for example, registered with the commodity marketplace. Data regarding these registered sellers may be stored in one or more databases such as the databases 226 of FIG. 1 to ensure that only registered sellers participate the marketplace.

The received seller marketing plan(s) may be generated by sellers hoping to sell some commodity. As discussed above, sellers may define their marketing plans by specifying, for example, the type of commodity they wish to sell, the amount of the commodity they wish to sell, at what prices, etc.

Step 1004 involves receiving at the interface a buyer marketing plan from a commodity buyer. Similarly, the interface may be accessible by otherwise receive a buyer marketing plan from a buyer that has registered with the commodity marketplace. Data regarding the registered buyer may be stored in one or more databases such as the database(s) 226 of FIG. 2.

The received buyer marketing plan may be generated by a buyer hoping to purchase some commodity. As discussed above, a buyer may define their marketing plan by specifying, for example, the type of commodity they wish to purchase, the amount of the commodity they wish to purchase, at what prices, etc.

Step 1006 involves selecting, using a processor executing instructions stored on memory, at least one of the seller marketing plans from the plurality of commodity sellers to satisfy the buyer marketing plan without presenting the seller marketing plans from the plurality of commodity sellers to the commodity buyer. A marketing plan selection module such as the marketing plan selection module 214 of FIG. 2 may analyze the received marketing plans and select one or more seller marketing plans to satisfy the buyer marketing plan. In some embodiments, more than one seller marketing plan may be selected to satisfy the buyer marketing plan. For example, a first seller marketing plan may satisfy a first portion of the buyer marketing plan, and a second marketing plan may satisfy a second portion of the buyer marketing plan.

Step 1008 involves generating a contract based on the buyer marketing plan and the selected at least one seller marketing plan for execution by the commodity buyer and at least one seller associated with the selected at least one marketing plan. Once one or more seller marketing plans are selected, a contract generation module such as the contract generation module 216 of FIG. 2 may generate a contract for execution by the appropriate parties. The generated contract may outline the terms acceptable to the contracting parties, and may be communicated to the appropriate parties.

Step 1010 involves receiving an executed contract from the commodity buyer and the commodity seller associated with the selected at least one seller marketing plan. Once the contracting parties execute the contract, they may transmit their executed contracts to the marketplace. The executed contracts may be stored in one or more databases such as the database(s) 226 for later retrieval, if necessary.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of operating a commodity marketplace, the method comprising:

presenting, using a first interface, a seller marketing plan template to each of a plurality of commodity sellers, each commodity seller operating a seller device executing program instructions to present the first interface, the first interface configured to allow a commodity seller using the seller device to input using natural language at least one feature regarding at least one commodity for sale, the at least one feature regarding the at least one commodity for sale including a desired amount of the commodity to sell;

receiving, through a network, a seller marketing plan from each of the plurality of commodity sellers, the seller marketing plan created using the first interface from the seller marketing plan template and comprising the at least one feature regarding the at least one commodity for sale;

presenting, using a second interface, a buyer marketing plan template to a commodity buyer operating a buyer device executing program instructions to present the second interface, the second interface configured to allow the commodity buyer using the buyer device to specify at least one feature using natural language regarding at least one desired commodity for purchase, the at least one feature regarding the at least one desired commodity for purchase including a desired amount of the desired commodity to purchase;

receiving, through the network, a buyer marketing plan from the commodity buyer, the buyer marketing plan created using the second interface from the buyer marketing plan template and comprising the at least one feature specified using natural language regarding the at least one desired commodity for purchase;

storing, in persistent storage, the buyer marketing plan as a data object for later use in a location associated with the at least one desired commodity for purchase;

executing, using a processor executing program instructions, at least one natural language procedure against the stored data object to perform at least one of identification, tagging, or search against the stored data object;

presenting the output of the at least one executed natural language procedure for review;

selecting, using the processor executing program instructions, a plurality of seller marketing plans from the plurality of commodity sellers to at least partially match the at least one feature for the at least one desired commodity for purchase in the buyer marketing plan using natural language processing to identify and categorize words or characters present in the at least one feature for the at least one desired commodity for purchase;

presenting, using the second interface, a list of the selected seller marketing plans to the commodity buyer;

receiving, via the second interface, feedback from the commodity buyer on at least one of the selected seller marketing plans, the feedback indicating the level of match between the buyer marketing plan and the selected seller marketing plan, automatically updating the processor executing program instructions with the received feedback to affect the future selecting of seller marketing plans, automatically generating, with the processor executing program instructions, a plurality of electronic contracts based on the buyer marketing plan and the matching plurality of the seller marketing plans for execution by the commodity buyer using the buyer device and each seller associated with each of the plurality of the seller marketing plans using the seller device, each electronic contract indicating a desired amount of a product based on the desired amounts of the commodity to sell; and automatically activating, through the network, at least one dispenser or elevator in operable communication with the network and associated at least one commodity seller to dispense the desired amount of the product indicated by the at least one corresponding electronic contract onto a conveyor belt for delivery to the commodity buyer.

2. The method of claim 1 wherein the at least one feature regarding the at least one commodity for sale is at least one of protein content, amino acid content, moisture content, alkalinity of the soil, acidity of the soil, a requirement for no-till agriculture, a potential carbon score range for the product, maximum toxin level, timeline of desired acquisition, types of fertilizers or pollination methods, types of animal feed, distance between buyer and seller, or transportation requirements.

3. The method of claim 1 wherein the at least one feature regarding the at least one commodity for purchase is a number of units to be purchased, a delivery period, or a delivery location.

4. The method of claim 1 wherein the first interface is a user interface.

5. The method of claim 1 wherein the contract is generated without presenting the plurality of seller marketing plans from the plurality of commodity sellers to the commodity buyer.

6. The method of claim 1 wherein identities of each of the plurality of commodity sellers are suppressed from each other and from the commodity buyer.

7. The method of claim 1 wherein the contract is generated without presenting the buyer marketing plans from the plurality of buyers to the commodity seller.

8. The method of claim 1 further comprising receiving an executed contract from the commodity buyer and the commodity seller associated with the selected at least one seller marketing plan.

9. The method of claim 1 wherein a first commodity seller satisfies a first portion of the buyer marketing plan, and a second commodity seller satisfies a second portion of the buyer marketing plan.

10. The method of claim 1 wherein the at least one dispenser or elevator is selected based on the level of match between the buyer marketing plan and the corresponding seller marketing plan.

11. A system for operating a commodity marketplace, the system comprising:
a persistent storage;
an interface for at least receiving:
a seller marketing plan from each of a plurality of commodity sellers, each seller marketing plan comprising at least one feature regarding at least one commodity for sale, the at least one feature regarding the at least one commodity for sale including a desired amount of the commodity to sell; and
a buyer marketing plan from a commodity buyer, the buyer marketing plan comprising at least one feature using natural language regarding at least one desired commodity for purchase, the at least one feature regarding the at least one desired commodity for purchase including a desired amount of the desired commodity to purchase; and
a processor executing instructions stored on memory and configured to:
store, in the persistent storage, the buyer marketing plan as a data object for later use in a location associated with the at least one desired commodity for purchase;
execute at least one natural language procedure against the stored data object to perform at least one of identification, tagging, or search against the stored data object;
present the output of the at least one executed natural language procedure for review;
select a plurality of seller marketing plans from the plurality of commodity sellers to at least partially match the at least one feature for the at least one desired commodity for purchase in the buyer marketing plan using natural language processing to identify and categorize words or characters present in the at least one feature for the at least one desired commodity for purchase, and
transmit a list of the selected seller marketing plans to the commodity buyer for presentation to the commodity buyer;
receive feedback from the commodity buyer on at least one of the selected seller marketing plans, the feedback indicating the level of match between the buyer marketing plan and the selected seller marketing plan;
automatically updating the processor executing program instructions with the received feedback to affect the future selecting of seller marketing plans; and automatically generate a plurality of contracts based on the buyer marketing plan and the selected plurality of the seller marketing plans for execution by the commodity buyer and each seller associated with each of the plurality of the seller marketing plans, each contract indicating a desired amount of a product based on the desired amounts of the commodity to sell; and automatically activating, through a network, at least one dispenser or elevator in operable communication with the network and associated at least one commodity seller to dispense the desired amount of the product indicated by the at least one corresponding contract onto a conveyor belt for delivery to the commodity buyer.

12. The system of claim 11 wherein a seller's marketing plan is defined by at least one of protein content, amino acid content, moisture content, alkalinity of the soil, acidity of the soil, a requirement for no-till agriculture, a potential carbon score range for the product, maximum toxin level, timeline of desired acquisition, types of fertilizers or pollination methods, types of animal feed, distance between buyer and seller, or transportation requirements.

13. The system of claim 11 wherein the buyer marketing plan is defined by at least one of a commodity to be purchased, number of units to be purchased, a delivery period, and a delivery location.

14. The system of claim 11 wherein the commodity is grain.

15. The system of claim 11 wherein the contract is generated without presenting the plurality of seller marketing plans from the plurality of commodity sellers to the commodity buyer.

16. The system of claim 11 wherein the identities of each of the plurality of commodity sellers are suppressed from each other and from the commodity buyer.

17. The system of claim 11 wherein the contract is generated without presenting the buyer marketing plans from the plurality of buyers to the commodity seller.

18. The system of claim 11 wherein the interface is further configured to receive an executed contract from the commodity buyer and the commodity seller associated with the selected at least one seller marketing plan.

19. The system of claim 11 wherein a first commodity seller satisfies a first portion of the buyer marketing plan, and a second commodity seller satisfies a second portion of the buyer marketing plan.

20. The system of claim 11 wherein the at least one dispenser or elevator is selected based on the level of match between the buyer marketing plan and the corresponding seller marketing plan.

* * * * *